UNITED STATES PATENT OFFICE.

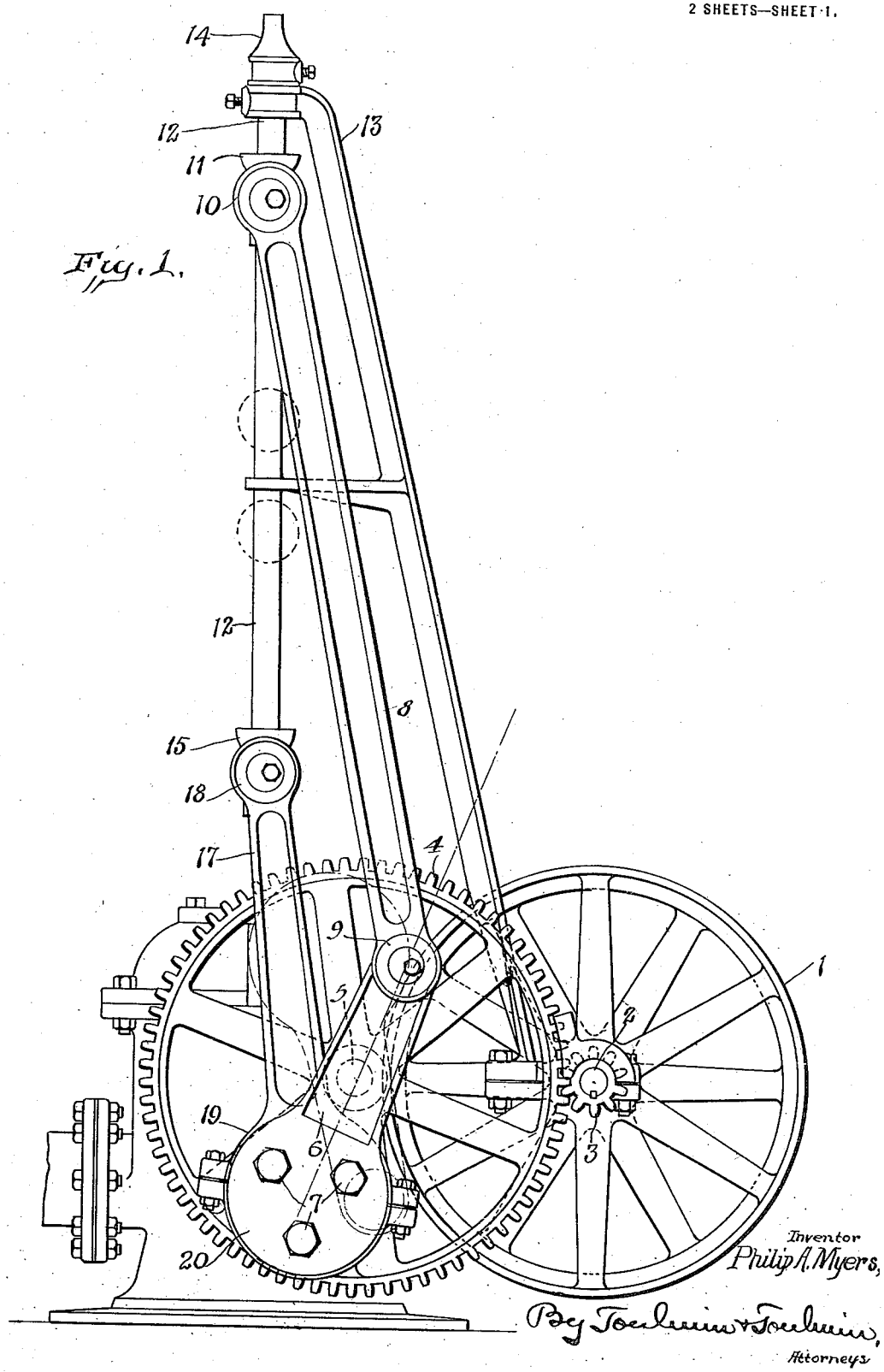

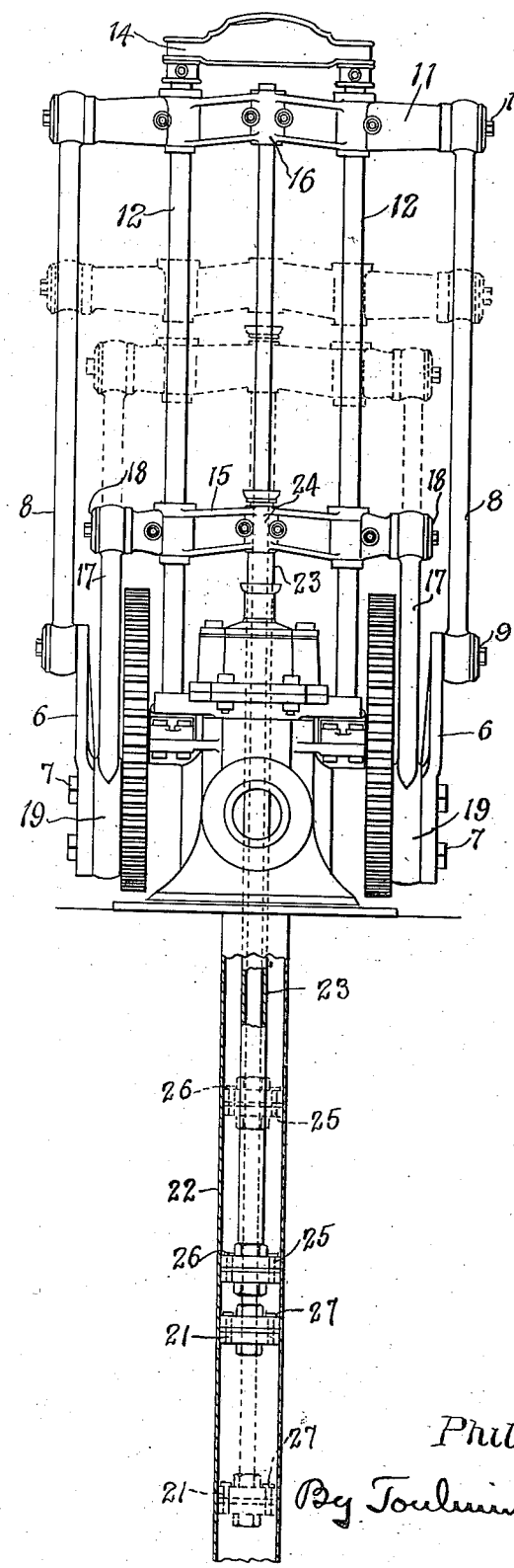

PHILIP A. MYERS, OF ASHLAND, OHIO, ASSIGNOR TO F. E. MYERS AND BROTHER, OF ASHLAND, OHIO, A COPARTNERSHIP CONSISTING OF FRANCIS E. MYERS AND PHILIP A. MYERS.

PUMP.

1,320,784. Specification of Letters Patent. Patented Nov. 4, 1919.

Application filed January 2, 1917. Serial No. 139,999.

*To all whom it may concern:*

Be it known that I, PHILIP A. MYERS, a citizen of the United States, residing at Ashland, in the county of Ashland and State of Ohio, have invented certain new and useful Improvements in Pumps, of which the following is a specification, reference being had therein to the accompanying drawing.

My invention relates to pumps.

The object of the invention is to provide a double acting working head to greatly increase the capacity of the pump and which will keep the fluid being pumped constantly moving with no cessation in the flow.

It is another object of my invention to overcome any concussion or jar in the operation of the pump.

It is an additional object to provide a pump of great simplicity and durability able to withstand vigorous and long continued usage.

It is also my object to provide certain novel features of construction described more particularly hereafter.

It is a further object to provide such a construction that both cross heads are never at the same time on dead center, but that when one is on dead center the other is traveling.

This pump embodying my invention I have found of especial value in irrigation of fields and small water works plants, although its use is unlimited and these applications are merely mentioned for the purposes of illustration.

My invention is an improvement upon the invention set forth in Patent No. 930,405, of Aug. 10, 1909, and Patent No. 333,477, of Dec. 29, 1885.

In the accompanying drawings, Figure 1 is a side elevation of a pump, without illustrating the piston heads and cylinder; and Fig. 2 is a front elevation of the entire machine including the cylinder and pistons.

Both Figs. 1 and 2 have the cross heads and accompanying links dotted in certain positions which they assume during the course of the operation of the pump.

In Fig. 1, 1 is the pulley wheel to which the power is applied by any suitable means. Upon the shaft 2 to which 1 is affixed is also fastened a small spur gear 3 meshing with a large bull wheel 4 turning on the shaft 5. Mounted upon this gear wheel 4 near the periphery thereof is a crank arm 6 bolted to the wheel 4 by the bolts 7, 7. This crank arm 6 is located eccentrically on 4. The longitudinal line drawn through this crank arm does not coincide with the center of the shaft 5, but is located to one side of it.

The crank 6 is connected to the link 8 at the point 9. This point 9 travels in a circle about 5. The upper end of 8 is attached at 10 to the cross head 11 which is guided by the standards 12, 12 supported in braces 13 united in the head 14. 15 is the smaller or minor cross head traveling on the guides 12, 12 and attached to the link 17 at the pivotal point 18. This link 17 is pivotally connected to the lower end of the crank arm 6 by having a strap 19 passed around the enlarged wrist of the crank arm 6. The point 18 moves up and down in a straight line. It will be seen from Fig. 1 that the line of the piston rod 16 does not pass through the center 5 around which the gear 4 and the crank arm 6 rotate. That is, the shaft 5 is offset and by rotating the gear 4 clockwise in Fig. 1 the advantage is gained that more than half of the rotation of gear 4 is applied to the upward movement of the piston rod 16. This also applies to the movement of the piston sleeve 23 which will be later referred to. In Fig. 2 the enlarged wrist of the crank arm 6 and the strap 19 can be clearly seen.

There is a pair of these crank arms, one on each side. The description just given of Fig. 1 would apply equally to the other side of the pump which is a duplicate of the one just detailed.

The major cross head 11 is connected at 16 to its piston rod, to the other end of which is connected a piston head 21 traveling in a cylinder 22. Surrounding the piston rod 16 is the piston sleeve 23 attached at 24 to the minor cross head 15. The other end of the piston sleeve 23 has a piston head 25 attached to it. These piston heads respectively have the usual valves 26 and 27.

The major cross head 11 and the minor cross head 15 travel back and forth on the guides 12, 12 through the motion imparted to them through their respective liks at 8 and 17.

The operation of the invention is as follows. Power is communicated through the pulley wheel 1, spur wheel 3 and the large gear 4, thus moving the crank arm 6 in a circular path around the shaft 5. The eccentrically placed arm 6 actuates the cross head 11 through the link 8 moving it up and down. Also the enlarged wrist oscillates the strap 19 and through the connecting rod 17 elevates and lowers the piston sleeve 23. In Fig. 1 the movement of gear 4 is in a clockwise position and therefore the piston rod 16 and the piston sleeve 23 are moved upwardly during more than half of the rotation of this gear 4. In Fig. 1 the crank arm 6 is at a point such that the connecting rod 8 has passed its highest position. It has started to descend and the piston sleeve 23 has begun to ascend because the enlarged wrist has passed the line joining the cross head 15 with the shaft 5. When the parts have made a half rotation from the position of Fig. 1 the opposite relation will ensue, namely, that the connecting rod 8 will then begin to ascend before the connecting rod 17 has reached quite the highest point of its travel. This relation of parts depends on the offset nature of the shaft 5 and it provides a continuous upward movement of the water in the pump cylinder.

While I have shown and described one embodiment of my invention it will be understood that the same has been chosen for the purposes of illustration only, and that I do not desire to be limited to the details of construction shown and described, for obvious modifications will occur to a person skilled in the art.

Having thus fully described my invention, what I claim as new and desire to secure by Letters Patent, is:—

1. In a pump, cross heads, and an actuating shaft common to said cross heads and connected thereto respectively through centers having different radii relative to said shaft so that the cross heads will approach and retreat from one another in such a way that when one has reached its limit of motion the other shall have already started on a new course, whereby a constant stream of fluid is furnished.

2. In a pump, cross heads, piston and piston heads connected thereto respectively, an actuating shaft common to said cross heads and connected thereto respectively through centers having different radii relative to said shaft so that the cross heads will approach and retreat from one another in such a way that when one has reached its limit of motion the other shall have already started on a new course, whereby a constant stream of fluid is furnished.

3. In a pump, a pair of cross heads, piston and piston rods connected thereto respectively, an actuating shaft common to said cross heads and connected thereto respectively through centers having different radii relative to said shaft so that the cross heads will approach and retreat from one another in such a way that when one has reached its limit of motion the other shall have already started on a new course, whereby a constant stream of fluid is furnished.

4. In a pump, a major cross head and a minor cross head, an actuating shaft having oppositely disposed actuating gears common to said cross heads, opposite pitmen for each of said cross heads and connecting the same respectively to said opposite gears on centers having different radii relating to said shaft for regulating the movement of the cross heads, whereby when one is on dead center the other is moving.

5. In a pump, a major cross head and a minor cross head, an actuating shaft having oppositely disposed actuating gears common to said cross heads, opposite pitmen for each of said cross heads and connecting the same respectively to said opposite gears on centers having different radii relating to said shaft for regulating the movement of the cross heads, whereby one end of each of said pitmen is caused to travel around a common center and their opposite ends to reciprocate in a straight line.

6. In a pump, a major cross head and a minor cross head, an actuating shaft having oppositely disposed actuating gears common to the cross heads and mounted on said shaft off-center relative to the plane of movement of said cross heads, opposite pitmen for each of said cross heads connecting the same respectively to said opposite gears on centers having different radii relating to said shaft for regulating the movement of the cross heads, whereby when one is on dead center the other is moving.

7. In a pump, a major cross head and a minor cross head, an actuating shaft having oppositely disposed actuating gears common to the cross heads and mounted on said shaft off-center relative to the plane of movement of said cross heads, opposite pitmen for each of said cross heads connecting the same respectively to said opposite gears and to a common source of power whereby when one of the cross heads is on dead center the other will be moving.

8. In a pump, a cross head, another cross head, a link attached to said first-mentioned cross head, a second link attached to the second mentioned cross head, a power wheel to which power is applied, a crank arm fastened at one end eccentrically upon said power wheel and at its other end to the free end of the first-mentioned link, the second-mentioned link pivotally connected at its other end to the end of the crank arm fastened to the power wheel, whereby the point of connection of the second link and its cross head will travel in a straight line and the point of connection of the first link and the crank arm will travel in a circle.

9. In a pump, a cross head, another cross head, means to guide said cross heads, a link attached to said first-mentioned cross head, a second link attached to the second-mentioned cross head, a power wheel to which power is applied, a crank arm fastened at one end eccentrically upon said power wheel and at its other end to the free end of the first-mentioned link, the second-mentioned link pivotally connected at its other end to the end of the crank arm fastened to the power wheel, whereby the point of connection of the cross head and second link will travel in a straight line and the point of connection of the first link and the crank arm will travel in a circle.

10. In a pump, a cross head, another cross head, piston rod and piston heads connected respectively to said cross heads, a cylinder, a link attached to the first-mentioned cross head, a second link attached to the second-mentioned cross head, a power wheel to which power is applied, a crank arm fastened at one end eccentrically upon said power wheel and at its other end to the free end of the first-mentioned link, the second-mentioned link pivotally connected at its other end to the end of the crank arm fastened to the power wheel, whereby the point of connection of the cross head and second link will travel in a straight line and the point of connection of the first link and the crank arm will travel in a circle.

11. In a pump, a cross head, another cross head, means to guide said cross heads, piston rod and piston heads connected respectively to said cross heads, a cylinder, a link attached to said first-mentioned cross head, a second link attached to the second-mentioned cross head, a power wheel to which power is applied, a crank arm fastened at one end eccentrically upon said power wheel and at its other end to the free end of the first-mentioned link, the second-mentioned link pivotally connected at its other end to the end of the crank arm fastened to the power wheel, whereby the point of connection of the cross head and second link will travel in a straight line and the point of connection of the first link and the crank arm will travel in a circle.

12. In a pump, a cross head with a piston rod and piston head traveling in a cylinder, a second cross head with its piston rod and piston head traveling in the same cylinder, a link attached to the first-mentioned cross head, a power wheel with a crank arm eccentrically fastened thereto at one end of said arm with the line of the longitudinal axis of said crank arm displaced to one side of the axis on which said power wheel turns, the second link connected to the end of the crank arm fastened to said power wheel the other end of said crank arm being connected to the free end of the first-mentioned link, whereby the point of connection of the cross head and second link will travel in a straight line and the point of connection of the first link and crank arm will travel in a circle.

13. In a pump, a cross head, another cross head, a link connected to one cross head, a link connected to the other cross head, a power wheel, a crank arm fastened eccentrically thereon, one end of which is connected to said first-mentioned link and the other end of which is connected to the second-mentioned link, whereby the crank arm is thrown ahead of the second link and when one cross head is on dead center the other cross head is moving.

14. In a pump, a cross head, a second cross head, means for guiding said cross heads, a piston rod and head attached respectively to each of said cross heads, a cylinder in which said pistons travel, a power wheel, a crank arm affixed eccentrically thereto with an enlarged wrist on said crank arm at the point of its connection to said power wheel, a link connected at one end to said second cross head and pivotally connected by a strap to the enlarged wrist of said crank arm, and a second link connected at one end to the other end of the crank arm and at its second end to the first-mentioned cross head, whereby one link is thrown ahead of the other link and one of the cross heads is always moving.

15. In a pump, two cross heads, a pump piston rod connected to one cross head, and a pump piston sleeve surrounding said piston rod and connected to the other cross head, a pump cylinder in which said piston rod and sleeve travel, a power wheel having its center placed out of line with said piston rod and sleeve, cranks driven by said wheel and rotating about the center of said wheel, rods connecting said cranks respectively to said cross heads, said cranks rotating in a direction such that they move the cross heads in the pumping strokes through more than half the movement of the cranks, and being positioned so that the crank in advance as the wheel rotates is less than half a rotation ahead of the other crank.

In testimony whereof, I affix my signature.

PHILIP A. MYERS.